United States Patent [19]
Waclawsky et al.

[11] Patent Number: 5,615,135
[45] Date of Patent: Mar. 25, 1997

[54] EVENT DRIVEN INTERFACE HAVING A DYNAMICALLY RECONFIGURABLE COUNTER FOR MONITORING A HIGH SPEED DATA NETWORK ACCORDING TO CHANGING TRAFFIC EVENTS

[75] Inventors: John G. Waclawsky, Frederick, Md.; Paul C. Hershey, Manassas, Va.

[73] Assignee: International Business Machines Corporation, Armonk, N.Y.

[21] Appl. No.: 456,759

[22] Filed: Jun. 1, 1995

[51] Int. Cl.$^6$ .................................................. G06F 11/34
[52] U.S. Cl. .................. 364/551.01; 364/514 B; 395/184.01
[58] Field of Search ............... 364/514 B, 550, 364/551.01; 395/180, 184.01

[56] References Cited

U.S. PATENT DOCUMENTS

| | | | |
|---|---|---|---|
| 3,426,331 | 2/1969 | Joyce | 395/184.01 |
| 3,714,635 | 1/1973 | Hamilton et al. | 395/775 |
| 5,051,947 | 9/1991 | Messenger et al. | 364/DIG. 2 |
| 5,081,297 | 1/1992 | Lebel et al. | 395/325 |
| 5,109,503 | 4/1992 | Cruickshank et al. | 395/500 |
| 5,365,514 | 11/1994 | Hershey et al. | 370/17 |
| 5,375,070 | 12/1994 | Hershey et al. | 364/550 |
| 5,493,689 | 2/1996 | Waclawsky et al. | 395/821 |
| 5,537,541 | 7/1996 | Wibecan | 395/184.01 X |

OTHER PUBLICATIONS

IBM Technical Disclosure Bulletin vol. 34, No. 4A, Sep. 1991, pp. 51–52, "Internal Performance Measurement Counters".

IBM Technical Disclosure Bulletin, vol. 34, No. 12, May 1992, pp. 269–275, "SRAM–Based Counters".

*Primary Examiner*—Edward R. Cosimano
*Attorney, Agent, or Firm*—Joseph C. Redmond; John D. Flynn

[57] ABSTRACT

A hardwired, dynamically reconfigurable counter array counts occurrences of different traffic events having different rates of occurrences monitored on a high speed data network by an Event Driven Interface (EDI). The array includes a plurality of "N" bit counters, where "N" is a binary multiple. The counters are arranged in an array of size "m,n", where "m" is the number of rows and "n" is the number of columns in the array. A signal input is provided to each counter as a first input, each signal being definitive of a specific traffic event occurring on the high speed network. Each counter is connected to the adjacent counter in the column through a multi-terminal logic element, each logic element in a column receives the output of a counter as a first input and provides an output to the succeeding counter as a second input. A counter logic switch responsive to an input signal generates a counter logic vector as an output. The vector comprises a plurality of outputs, each output being provided to a different row of the array as a second input to each logic element. Means are provided for changing the signal inputs and/or the counter logic vector to configure or reconfigure the counters in the array to individual or group counters of the same or different sizes. The counter sizes are selected to match the counting requirements of different traffic events being monitored on the network by the EDI.

11 Claims, 5 Drawing Sheets

EVENT DRIVEN INTERFACE HAVING A DYNAMICALLY RECONFIGURABLE COUNTER FOR MONITORING A HIGH SPEED DATA NETWORK ACCORDING TO CHANGING TRAFFIC EVENTS

BACKGROUND OF THE INVENTION

1. Field of the Invention

This invention relates to high speed data communication systems. More particularly, the invention relates to apparatus and methods for monitoring and controlling such data communications.

2. Description of the Prior Art

An Event Driven Interface (EDI) is described in U.S. Pat. No. 5,365,514 issued Nov. 15, 1994 and U.S. Pat. No. 5,375,070 issued Dec. 20, 1994, both of which are assigned to the same assignee as that of the present invention and are incorporated herein in their entirety by reference. The '070 patent describes a system and process that allows the collection of traffic events to be organized and ordered so that the relationships between the events and the events themselves can be identified as a state or a series of states which describe and allow control of performance aspects of the protocol activity in the network. More specifically, the '070 patent describes dynamic programming of multiple devices for the purpose of coordination and correlation of events such that monitoring, performance analysis and control can be accomplished on a real time basis for any high speed network. The '514 patent describes a sub-system in the '070 patent for monitoring and control of the data communications network. The network communicates a serial stream of binary bits having a characteristic pattern. The system includes a control vector generator for generating a control vector C(i) which describes the characteristic pattern and an event vector analyzer for generating an event vector E(i) which represents a plurality of occurrences of the pattern on the network.

In monitoring and controlling networks, the event driven interface (EDI) requires an array of counters to store the traffic patterns identified as indicative of various traffic conditions. From time to time, the information collection architecture, which the EDI is a part of, must be reconfigured due to changing monitoring and control requirements of the high speed data communications network. For each new reconfiguration, the counter array must be adapted to capture any new data. As the counters are reconfigured, different line delays, different line loadings and different layouts alter the counting process with the risk of possibly not meeting timing requirements on the network. A reconfigurable standard hardwired counter having a substantially uniform electrical characteristic and permitting a wide variety of traffic patterns to be counted by the EDI without the introduction of timing problems would advance the state of monitoring and controlling the performance of high speed networks.

In the prior art, the following patents address related subject matter to the present invention, as follows:

IBM TDB Bulletin September 1991, page 51, describes an internal performance measurement counter which uses programmable counters for counting hardware events or event duration in a data processing system, not traffic patterns in a high speed data communication network. When the counters are half full or a specific counter is to be changed, microcode is initiated in the systems to accumulate counts in a main store or switch the counter to count different events.

IBM TDB, May 1992, page 269 describes a SRAM-based counter to track protocol timing and monitor statistics for all ports in a local area network environment. The counter minimizes problems with respect to register-based counters from a space standpoint and limitations in expanding such counters due to unforeseeable conditions at the time of system implementation.

U.S. Pat. No. 5,051,947 issued Sep. 24, 1991 describes a text processor including cell arrays which can be configured in such a way as to link counters of adjacent cells together to form a single virtual counter with N times as many bits as a single counter. The cell arrays are programmable in such a way as to effectively extend the limited length of a counter in each cell to an arbitrarily larger counter. However, the '947 counter is not adapted to count different events.

U.S. Pat. No. 5,081,297 issued Jan. 14, 1992, discloses a reconfigurable signal processing device that includes a plurality of programmable modules which are reconfigurable to form one of a plurality of selected signal processing functions. The '297 patent is directed to analyzing patterns of analog signals, not digital signals. Further, the '297 patent does not program counters into arbitrary sizes or manage them into different configurations. Also, the '297 patent is not directed to managing counters into larger size counters but rather into different module configurations such as an accumulator, an address register, a delay circuit, a timer, etc.

U.S. Pat. No. 3,714,635 issued Jan. 30, 1973, describes a programmable adapter with counters that may be chained together for longer counts. A chaining gate responsive to a bit multiplies counters together. When the bit is on, a binary counter will start when the counter in the previous segment has been reduced to zero. The chaining feature permits a standard adapter to be loaded by a program with various parameters necessary to identify and control a specific operation on any particular unit. This feature eliminates the requirements for specially designed interface adapters for each IO device to be controlled by a computer/controller system.

U.S. Pat. No. 5,109,503 issued Apr. 28, 1992, discloses a reconfigurable counter that may be programmed to emulate a plurality of different counter types. The reconfigurable counter is used in conjunction with a program logic controller. Alternatively, the counter may be used with various host devices such as a personal computer or as a stand alone with various operator interface devices, such as a typical keyboard or key pad. The '503 counter is not a dynamically reconfigurable, hardwired counter, but rather programmed in memory to emulate a plurality of different counter types.

None of the prior art provides a solution to the problem of reconfiguring a standard hardwired counter into variable sizes and for an EDI device in selectively collecting traffic patterns on a data communications network for monitoring and control purposes.

SUMMARY OF THE INVENTION

An object of the invention is a standard hardwired counter array reconfigurable into different sizes for an Event Driven Interface (EDI) in monitoring a high speed data network for control purposes.

Another object is a hardwired counter array reconfigurable into groups of standard counters which are multiples of a standard counter.

Another object is a hardwired counter array reconfigurable into groups of counters of different sizes using a counter logic vector and a control vector to selectively form the counter groups and select performance parameters of a high speed network to be monitored for control purposes.

Another object is a method of reconfiguring a hardwired counter array into variable size counters according to an event being monitored on a high speed network by an event driven interface.

These and other objects, features and advantages are accomplished in a standard "n" bit counter size where "n" is a binary multiple. A plurality of the "n" bit counters are arranged in a matrix (m,n) where "m" is the number of rows and "n" is the number of columns in the matrix. Each counter is connected to a signal source being monitored by an Event Driven Interface (EDI) for a performance parameter. A control vector $C(i)$ is provided to the EDI to select which network performance parameters are to be monitored by the EDI. A multiplexer interconnects adjacent counter in each column in series. A counter logic switch provides an output to each multiplexer in the first matrix column. Each first column multiplexer provides an output to a corresponding multiplexer in the next column of the matrix. Each counter provides an output signal and such signals are combined to form an event vector $E(i)$. When the control vector $C(i)$ requires the array to be reconfigured into larger size counters for monitoring selected performance parameters, the signal sources to the counters for the non-selected performance parameters are discontinued or turned "off". Simultaneously, a counter logic vector is applied to the multiplexers and the array is reconfigured into groups of counters of different sizes, according to the counting sizes required by the control vector $C(i)$ without the introduction of timing problems on the network.

DESCRIPTION OF THE DRAWINGS

The objects, features and advantages of the invention will be more fully apprehended from the following description of preferred embodiment taken in conjunction with the accompanying figures.

DESCRIPTION OF PREFERRED EMBODIMENT

Figure 1:
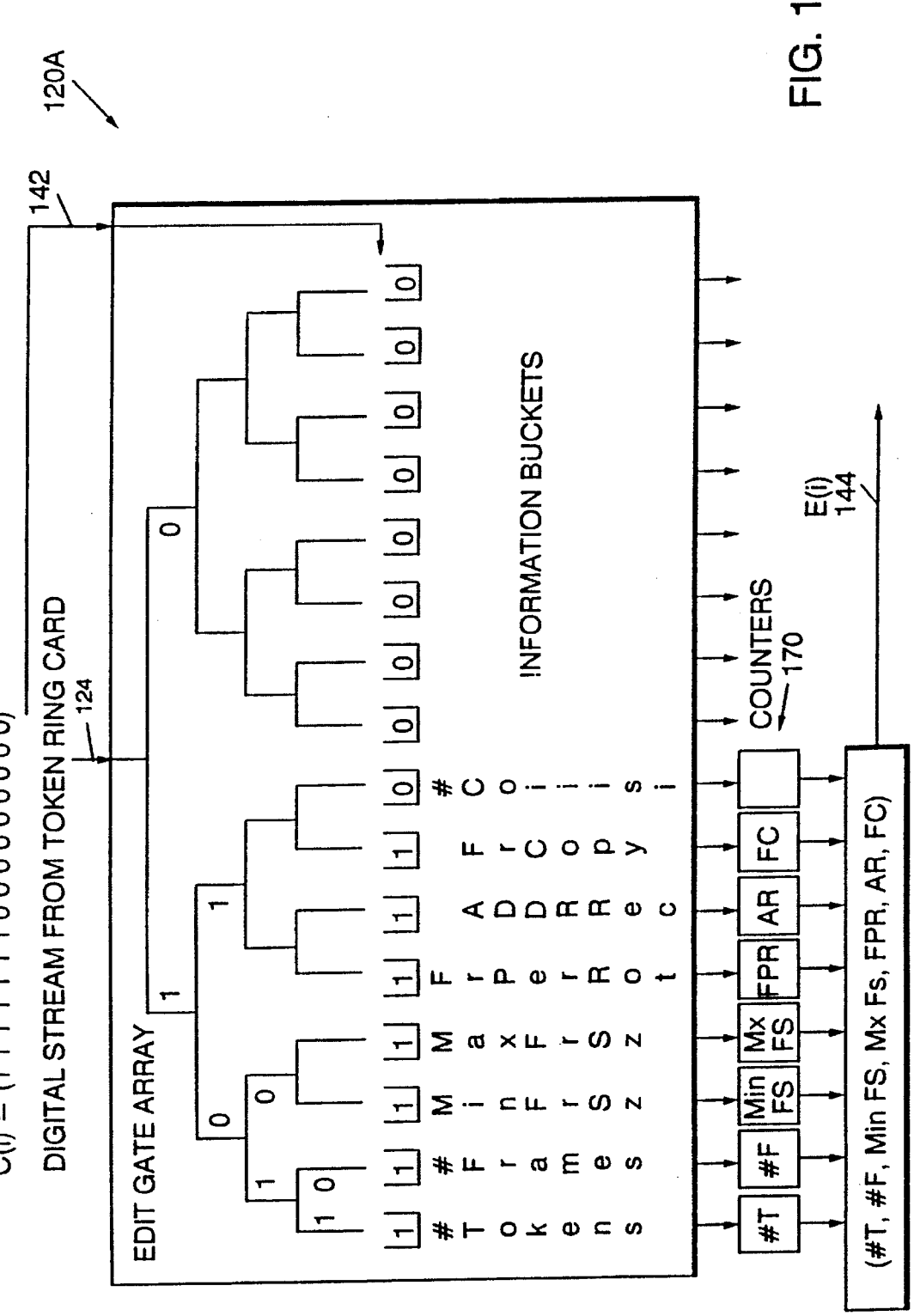
FIG. 1 is a block diagram of a prior art Event Driven Interface (EDI) including a plurality of counters.

In FIG. 1, an Event Driven Interface (EDI) 120A described in U.S. Pat. No. 5,365,514 receives a control vector $C(i)$ on line 142 from an expert system (not shown), as more fully described in the '514 patent. The control vector $C(i)$ configures the EDI 120A to collect specified performance parameters for a specified data communication network protocol which in one instance may be a token ring. In response to the monitoring operation performed by the EDI, an Event Vector $E(i)$ is generated on line 144 by the EDI. The vector defines network performance in terms of specified network parameters such as number of tokens, number of frames, etc. The expert system uses these parameters to compute a desired network performance matrix which is compared against an optimal behavior matrix. If poor performance is determined, the expert system can take remedial action such as outputting a control signal to modify the traffic pattern on the token ring. Alternatively, the expert system can output control information to alter the path over which communications are being conducted between a sender node and a destination node.

In FIG. 1, the EDI 120A receives incoming data from a local area network 124, for example, with user defined filter patterns in real time. If the incoming data matches the user defined filter patterns, external output lines 144 are activated. These lines output the Event Vector $E(i)$ or they can be used to cause a storage of the incoming data, the triggering of other devices and/or the synchronization of external devices. A counter(s) 170 can be incremented each time a successful match is made for the particular performance parameter being monitored. Several types of patterns can be counted in a corresponding number of counters 170. The accumulated counts will then form the vector $E(i)$. In addition, the filter can be placed in a mode where the external output lines 144 are activated when the incoming data does not match one of the user defined filter patterns. The number of filter patterns can be specified as dependent on the amount of filter memory implemented.

From time to time, counters 170 must be reconfigured to accommodate different digital signal patterns for particular performance parameters being monitored. Typically, the counters must be changed in width, either increased or decreased in size. One way to reconfigure the counters is to reroute the lines which introduces different line delays and introduces the risk of the EDI not meeting timing requirements for monitoring performance parameters.

Figure 2:
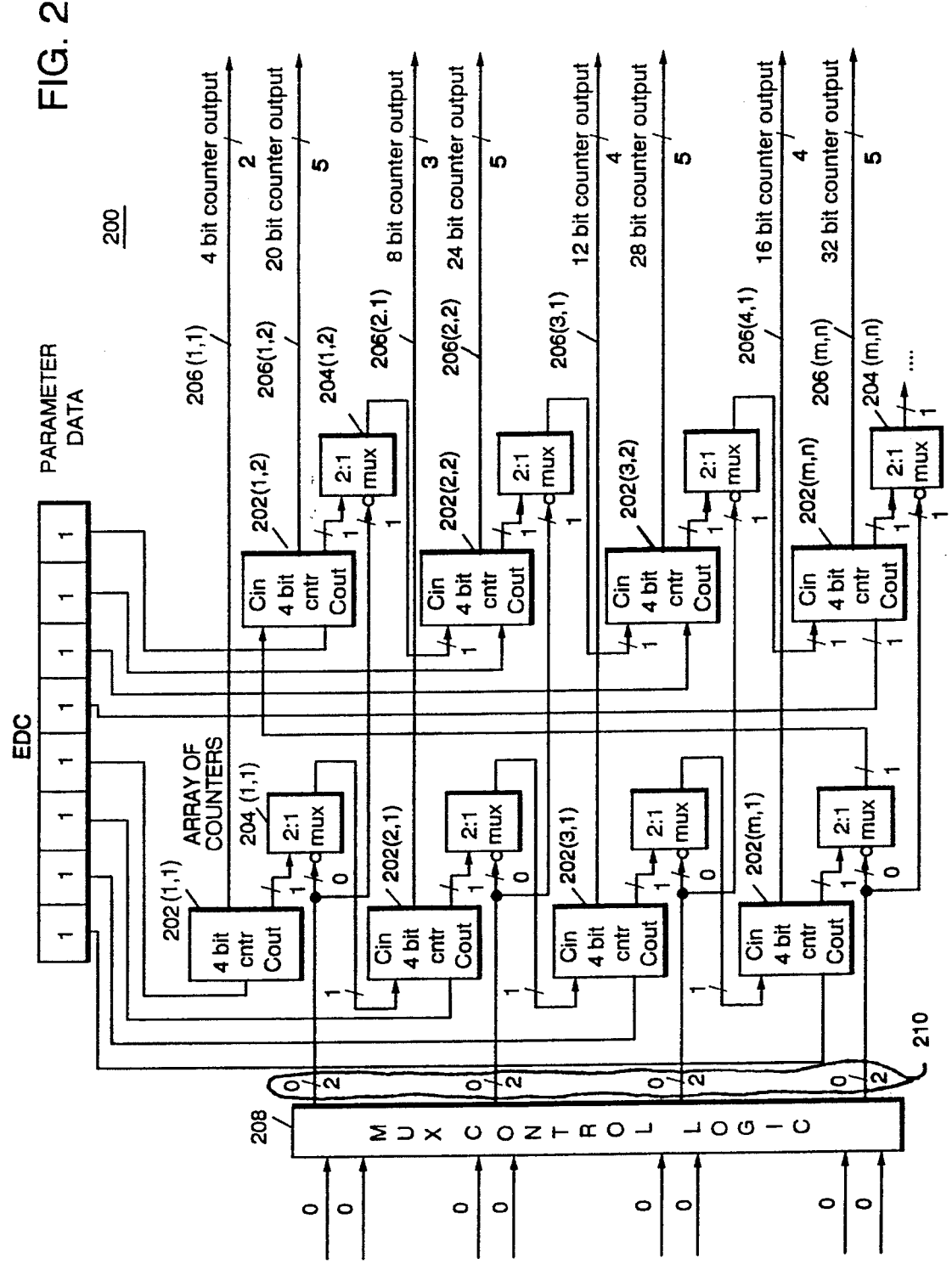
FIG. 2 is an array of reconfigurable counters which incorporates the principles of the present invention and applicable to the Event Driven Interface of FIG. 1.

FIG. 2 shows a reconfigurable counter array 200 which may be substituted for the counters shown in FIG. 1. The array, in one form, comprises a plurality of standard four bit counters $202_{(m,n)}$ arranged in a matrix m, n where "m" is the number of rows and "n" is the number of columns in the matrix. Each counter in a column is serially connected to the other counters in the column through a 2:1 multiplexer $204_{(M,N)}$. Each counter in a column receives a first input signal from the EDI and a second input signal from the adjacent multiplexer. Each counter provides an output signal $206_{(M,N)}$. Since the counters are serially connected to one another, a counter output may be a multiple of the number of counters coupled together. Thus, output $206_{(1,1)}$ is a 4 bit counter output; output $206_{(2,1)}$ is an 8 bit counter output; output $206_{(3,1)}$ is a 12 bit counter output and output $206_{(4,1)}$ is a 16 bit counter output and so forth.

The output of counter $202_{(1,1)}$ is provided as an input to a second row of counters $202_{(1,2)}$. The counters in column 2, like those in column 1, are serially connected together through 2:1 multiplexers $204_{(2,1)} \ldots, 204_{(M,N)}$. Each counter $202_{(m,2)}$ provides an output $206_{(1,2)} \ldots, 206_{(m,2)}$. Again, the outputs of counters $202_{(m,2)}$ is a multiple of the number of counters combined. Thus, the output $206_{(1,2)}$ is a 20 bit counter; the output of $206_{(2,2)}$ is a 24 bit counter . . . and the output of counter $206_{(m,n)}$ is a 32 bit counter.

As previously indicated, each counter $202_{(m,n)}$ is connected to a different EDI signal source. The control vector $C(i)$ indicates the signal source to be counted by the presence of an On signal (1) or not to be counted by the absence of an On signal (0).

A counter logic switch 208 provides a plurality of outputs 210 as a counter logic vector, each output being connected to a different 2:1 multiplexer in column 1. Each multiplexer $204_{(m,n)}$ receives a first input signal from the adjacent counter and the switch output as a second input. The switch outputs are also connected to the corresponding multiplexers $204_{(m,n)}$ in column 2 as a second inputs to the multiplexers.

By changing the inputs to the counter logic switch 208 and changing the control vector C(i) to select the parameters to be monitored, the counter array can be reconfigured into various counters of different sizes or widths according to the frequency of occurrence of the parameters to be monitored by the EDI.

In reconfiguring the array 200, one input to each multiplexer is the carry-out signal from a 4 bit counter. The other input is an active low signal as a counter logic vector from the counter logic switch. The counter logic vector determines which multiplexer input to pass to the multiplexer output to the succeeding counter. The counter logic vector is configured at system reset and can be implemented with a set of latches. The multiplexer output becomes a carry in signal to a different 4 bit counter. By so connecting the 4 bit counter carry out and carry in signals, the array of counters can be configured to include a different number of counters with a choice of size (e.g., 4 bit, 8 bit, 12 bit, 16 bit etc.). Emitter coupled logic counters are available with clocking frequencies that exceed 100 MhZ. Thus, 50 Mbps reconfigurable counter arrays having substantially uniform electrical characteristic are realizable with off the shelf technology. In addition to speed advantages, the array of counters implementation also provides dynamic reconfiguration advantages such as consistent signal path delays, line loading and layout. With these advantages, each new counter configuration will meet the signal timing specification of the EDI.

In FIG. 2, the counting status for the array 200 is shown for the monitoring condition where the counter logic vector is all 0s or the absence of a signal and the control vector C(i) is all 1's for monitoring all parameter signals. In this condition, the array is configured into eight (8) counters, each counter providing an output of a 4 bit count. All the multiplexers 204 are disabled because of the absence of an input from the counter logic vector. As a result, the counters $202_{(m,n)}$ are not sequentially combined into groups of different size counters.

Figure 3A:
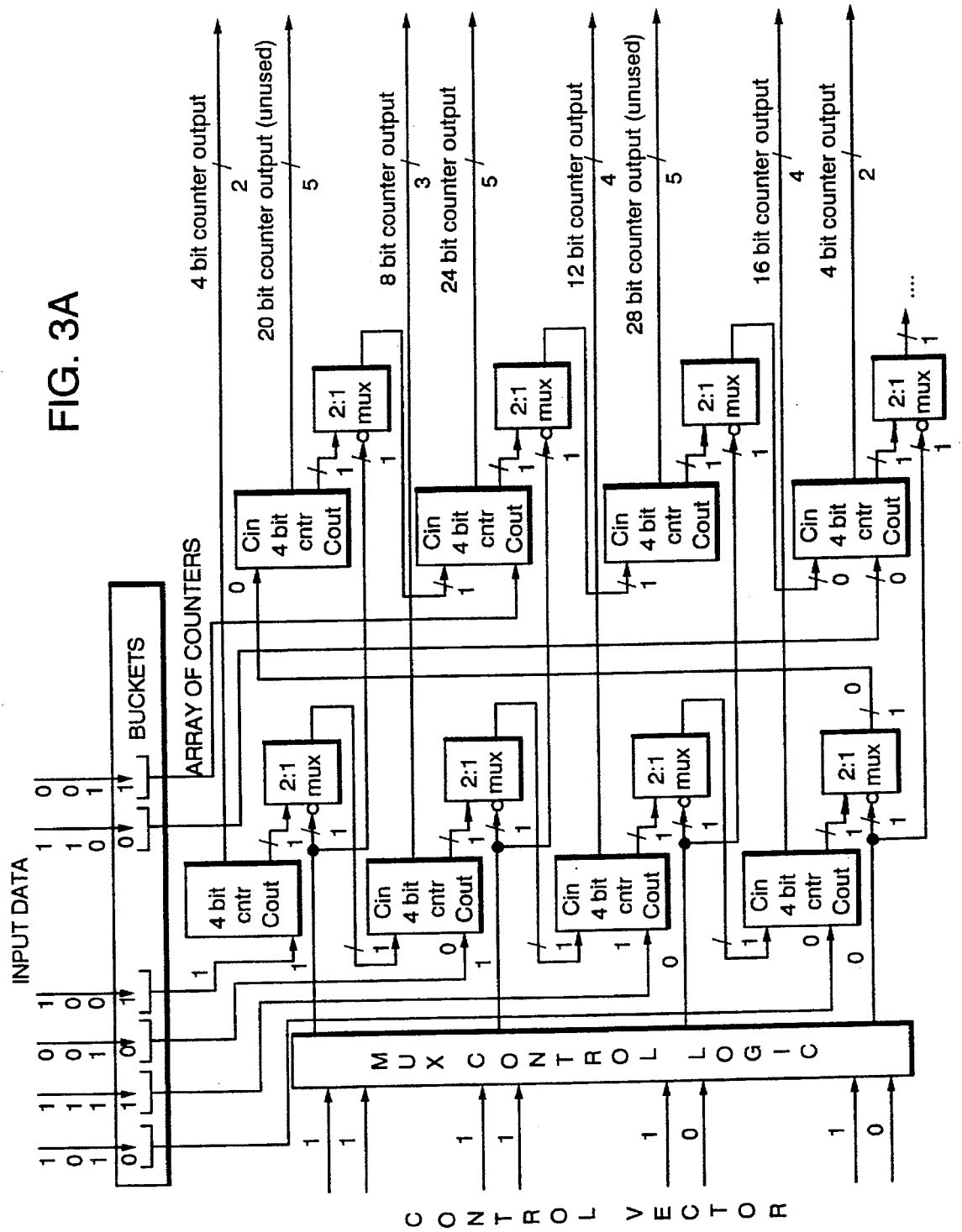
FIGS. 3A–3B are circuit diagrams of parameter signals specified by a control vector $C(i)$ and logic signals specified for a counter logic switch in reconfiguring the counters of FIG. 2 into groups of different binary sizes for the Event Driven Interface of FIG. 1.

In FIG. 3A, the counter logic vector is changed to 1100, and the control vector C(i) is changed to 01011 for six (6) parameter signals. The signals for two parameters which have been turned off by the control vector C(i) reconfigures the counters into six (6) counters comprising two 4; one 8; one 12; one 16, and one 24 bit counter for the six parameters being monitored by the EDI.

Figure 3B:
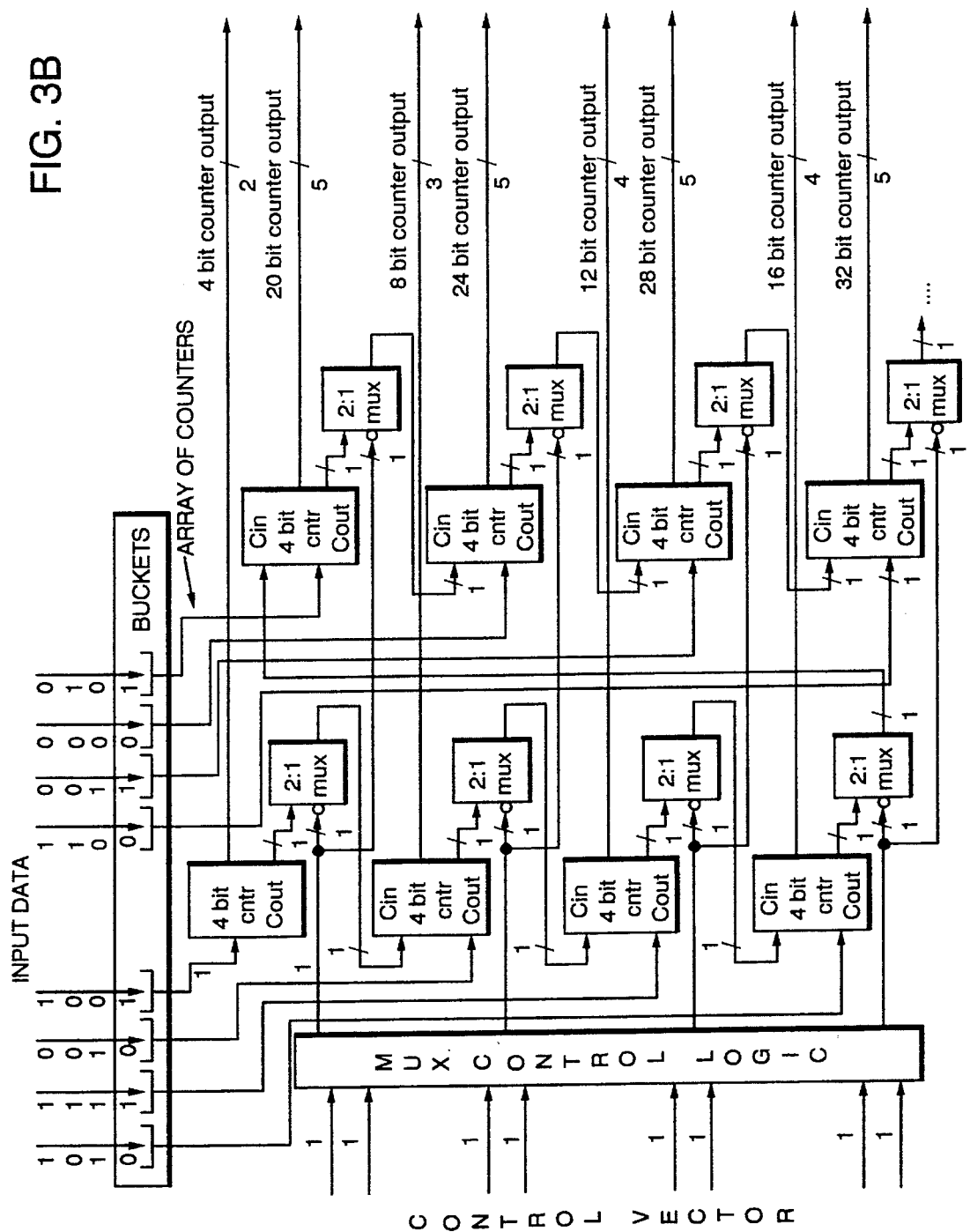

In FIG. 3B, the counter logic vector has been changed to 1111 and the control vector C(i) has restored monitoring all eight (8) parameters. In this condition, the array is re-configured into eight (8) counters of different sizes comprising one 4; one 8; one 16; one 20; one 24; one 28 and one 32 bit counter through the serial combination of single 4 bit counters into different groups.

Figure 4:
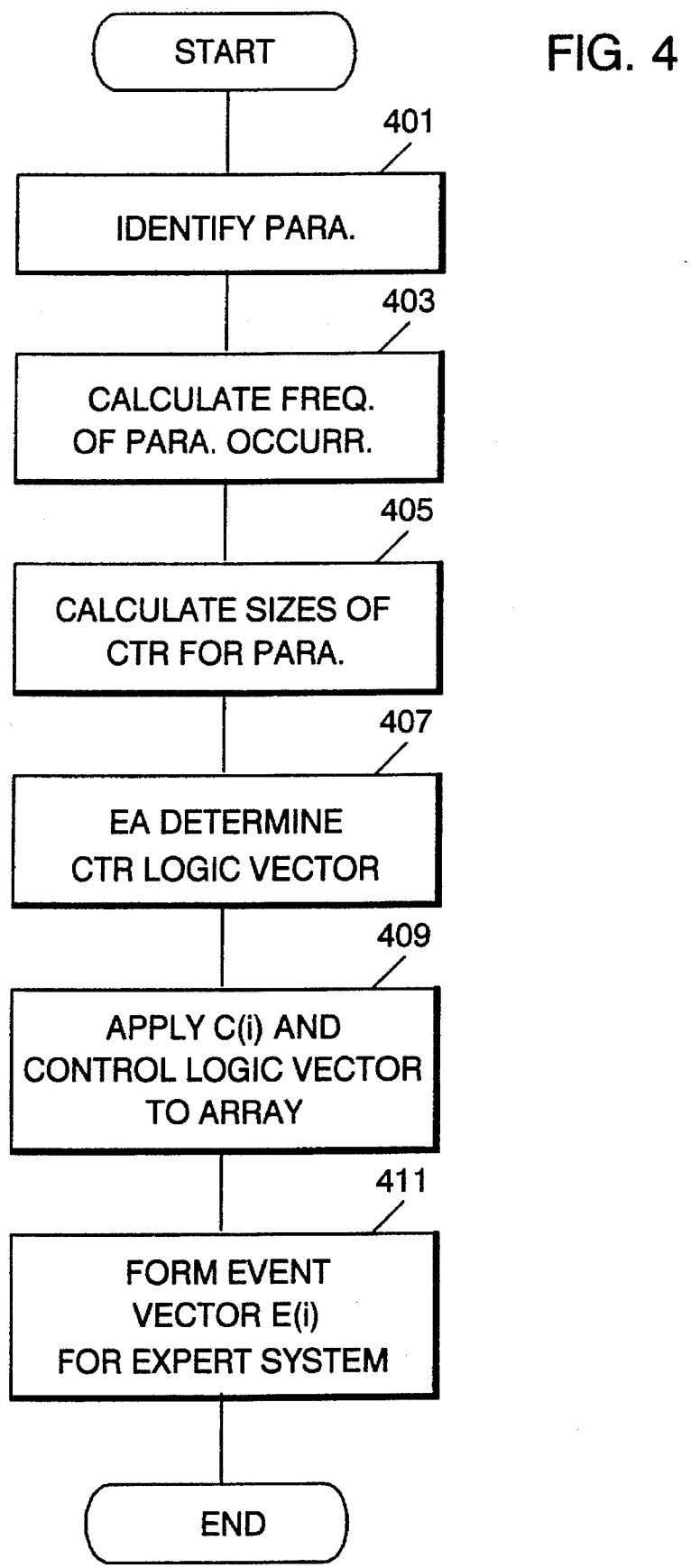
FIG. 4 is a flow diagram of a method for reconfiguring a plurality of standard size counters into groups of counters of different sizes according to digital patterns being monitored on a data communications network by an Event Driven Interface.

In FIG. 4, a flow diagram is given for reconfiguring the counters according to the set of performance parameters to be monitored. In step 401, the particular performance parameters to be monitored and counted are identified in the EDI by defining the control vector C(i) for such parameters. The control vector is set into the EDI parameter signal sources shown in FIG. 1.

In step 403, the anticipated frequency of occurrence for each parameter is determined. Based upon the frequency of occurrences for each parameter, the sizes of the counters required for the frequency of occurrence is determined in step 405. The determination of counter sizes can be computed iteratively by selecting an arbitrary counter size and determining if a counter reaches its maximum count, i.e., the counter wraps. If such is the case, a larger size counter should be selected and the procedure repeated. The process is continued until the counter does not wrap. When this occurs, the counter size has been determined. Alternatively, the maximum counter size can be computed using historical data collected by a traditional trace device where this is possible or by using theoretical limits. A counter logic vector is determined in step 407 which will combine the counters in combinations according to the size counter required for each particular parameter being monitored. The counter logic vector and performance monitoring signals are applied to the counter array in step 409. An event vector E(i) is formed by the array in step 411 for use by an expert system (not shown) for determining the performance of the network with respect to its optimal behavior as more fully described in U.S. Pat. No. 5,365,515.

While the invention has been shown and described with respect to a single embodiment, it is also within the scope of the invention to expand the array to any size and include additional counters and multiplexers beyond a counter or group of counters for each parameter being monitored. In such case, the counter logic vector would be increased in size which would permit counters to be combined into different widths without decreasing the number of parameters being monitored. Accordingly, the scope of the invention should not be limited with respect to the size of the counter array or length of the counter logic vector in monitoring network performance parameters.

Accordingly, although specific embodiments of the invention has been disclosed or suggested, it should be understood by those having skill in the art that changes can be made to that specific embodiment without departing from the spirit and the scope of the invention.

What is claimed:

1. In an event driven interface (EDI) for a high speed data communications network, a hardwired, dynamically reconfigurable counter array for counting the occurrences of different traffic events having different rates of occurrences being monitored on the network by the EDI, comprising:

a) a plurality of "N" bit counters, where "N" is a binary multiple; the counters being arranged in an array of size "m,n", where "m" is the number of rows and "n" is the number of columns in the array;

(b) a signal input to each counter as a first input, each signal being definitive of a specific traffic event occurring on the high speed network;

(c) each counter connected to the adjacent counter in the column through a multi-terminal logic element; each logic element in a column receiving the output of counter as a first input and providing an output to the succeeding counter as a second input:

(d) a control vector C(i) definitive of the signal inputs to be counted by the respective counters;

(e) a counter logic switch responsive to a counter logic vector for providing a plurality of outputs, each output provided to a different row of the array as a second input to each logic element in the same row of the array; and (f) means for changing the contents of the control vector C(i) and/or the counter logic vector to configure or re-configure the counters in the array to individual or group counters of the same or different sizes for matching the counting requirements of different traffic events being monitored on the network by the EDI to such individual or groups of counters.

2. The counter array of claim 1 wherein the counters provide outputs of different counter sizes according to the control vector $c(i)$ and/or the counter logic vector.

3. The counter array of claim 2 wherein the logic element is a multiplexer.

4. The counter array of claim 3 wherein the counter is a standard binary counter.

5. The counter array of claim 4 wherein the counter outputs are multiples of the standard binary counter.

6. The counter array of claim 5 wherein the outputs of the counters are combined into an event vector $E(i)$ for use by an expert system.

7. The counter array of claim 6 further wherein the array is reconfigured in real time without altering the timing or the frequency of occurrences of the traffic events being monitored on the network by the EDI.

8. In an event driven interface (EDI) for a high speed data communications network, a hardwired, dynamically reconfigurable counter array for counting the occurrences of different traffic events having different rates of occurrences being monitored on the network by the EDI, a method of configuring or reconfiguring the counter array comprising the steps of:

a) identifying the traffic events to be monitored by the EDI and counted by the array; b) forming and providing a control vector $C(i)$ as an input to the EDI for specifying the traffic events to be monitored by the EDI and counted by the array; c) calculating the frequency of occurrences of the different traffic events being monitored by the EDI; d) determining a counter logic vector for application to the array to configure or re-configure the array into individual or groups of counters for matching the counting requirement of the traffic events to the size of the counter or groups of counters for counting such traffic events; and e) applying the counter logic vector to a counter logic switch for configuring or re-configuring the array to count in real time the occurrences of different traffic events having different rates of occurrences being monitored on the network by the EDI without altering the timing of such traffic events on the network.

9. The method of claim 8 further comprising the step of forming an event vector $E(i)$ from the array outputs for use by an expert system in controlling the performance of the network.

10. The method of claim 9 wherein the counter logic vector forms the array to provide a plurality of outputs corresponding to the number of counters, each output being a different binary multiple.

11. The method of claim 10 wherein the counter logic vector in combination with the control vector $C(i)$ form the array to provide a plurality of outputs less than the number of counters in the array and of different or the same binary multiple.

\* \* \* \* \*